(12) United States Patent
Madsen et al.

(10) Patent No.: US 11,231,021 B2
(45) Date of Patent: *Jan. 25, 2022

(54) POWER GENERATION PROCESS

(71) Applicant: Saltkraft ApS, Sønderborg (DK)

(72) Inventors: Henrik Tækker Madsen, Copenhagen (DK); Steen Søndergaard Nissen, Ellicott City, MD (US)

(73) Assignee: SALTKRAFT APS, Sønderborg (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/630,121

(22) PCT Filed: Jul. 11, 2018

(86) PCT No.: PCT/EP2018/068804
§ 371 (c)(1),
(2) Date: Jan. 10, 2020

(87) PCT Pub. No.: WO2019/011991
PCT Pub. Date: Jan. 17, 2019

(65) Prior Publication Data
US 2020/0158096 A1    May 21, 2020

(30) Foreign Application Priority Data
Jul. 12, 2017 (GB) .................... 1711240

(51) Int. Cl.
*F03G 7/04* (2006.01)
(52) U.S. Cl.
CPC .................... *F03G 7/04* (2013.01)

(58) Field of Classification Search
CPC . F03G 7/04; F03G 7/005; Y02E 10/30; Y02E 10/10
See application file for complete search history.

(56) References Cited

U.S. PATENT DOCUMENTS 4,099,381 A   7/1978 Rappoport
5,029,444 A   7/1991 Kalina
(Continued)

FOREIGN PATENT DOCUMENTS

AU   2007319995   5/2008
CN      1853044  10/2006
(Continued)

OTHER PUBLICATIONS

Notification of Transmittal of the International Search Report and Written Opinion of the International Search Authority—The European Patent Office—dated Oct. 15, 2018 for PCT/EP2018/068804, 13 pages.

(Continued)

*Primary Examiner* — Hoang M Nguyen
(74) *Attorney, Agent, or Firm* — Jackson Walker LLP; Christopher J. Rourk

(57) ABSTRACT

A process for generating power from a warm saline steam (1) obtained from geothermal sources. The process involves converting latent osmotic energy present in the stream (1) into an increase in the total pressure of said stream by passing through an osmotic pump unit (7). The stream is passed over a semi-permeable membrane (8) and a lower salinity steam (14) is passed over the other side of said membrane (8), such that the need for mechanical pumping in subsequent process steps is reduced.

19 Claims, 8 Drawing Sheets

(56) References Cited

U.S. PATENT DOCUMENTS

| | | | |
|---|---|---|---|
| 7,392,848 B1* | 7/2008 | Bader | E21B 43/20 |
| | | | 166/371 |
| 7,857,978 B2 | 12/2010 | Jensen et al. | |
| 10,100,816 B2* | 10/2018 | Nissen | F03G 7/04 |
| 2002/0178723 A1 | 12/2002 | Bronicki et al. | |
| 2009/0032446 A1 | 2/2009 | Wiemers et al. | |
| 2009/0261040 A1 | 10/2009 | Pruet | |
| 2010/0024423 A1 | 2/2010 | McGinnis et al. | |
| 2010/0043640 A1 | 2/2010 | Kelly | |
| 2010/0071366 A1 | 3/2010 | Klemencic | |
| 2010/0140162 A1 | 6/2010 | Jangbarwala | |
| 2010/0183903 A1* | 7/2010 | McGinnis | C02F 1/16 |
| | | | 429/50 |
| 2010/0192575 A1 | 8/2010 | Ml-Mayahi et al. | |
| 2010/0282656 A1* | 11/2010 | Cath | E03B 3/15 |
| | | | 210/170.11 |
| 2011/0044824 A1 | 2/2011 | Kelada | |
| 2011/0046074 A1 | 2/2011 | Kumar et al. | |
| 2011/0272166 A1 | 11/2011 | Hunt | |
| 2012/0067819 A1* | 3/2012 | McGinnis | C02F 1/447 |
| | | | 210/640 |
| 2012/0117967 A1 | 5/2012 | Loveday et al. | |
| 2012/0267307 A1 | 10/2012 | McGinnis | |
| 2013/0001162 A1 | 1/2013 | Yangali-Quintanilla et al. | |
| 2013/0232973 A1 | 9/2013 | McBay | |
| 2013/0318870 A1 | 12/2013 | Lim | |
| 2014/0026567 A1 | 1/2014 | Paripati et al. | |
| 2014/0102095 A1 | 4/2014 | Shim et al. | |
| 2014/0138313 A1 | 5/2014 | Sato | |
| 2014/0138956 A1 | 5/2014 | Sano et al. | |
| 2014/0319056 A1 | 10/2014 | Fuchigami et al. | |
| 2015/0352497 A1 | 12/2015 | Sakai et al. | |
| 2015/0369521 A1 | 12/2015 | Buscheck et al. | |

FOREIGN PATENT DOCUMENTS

| | | |
|---|---|---|
| CN | 103547798 | 1/2014 |
| CN | 203505325 | 4/2014 |
| EP | 1885477 B1 | 2/2008 |
| EP | 2305368 | 4/2011 |
| EP | 2693050 | 2/2014 |
| FR | 3009613 | 2/2015 |
| JP | 2014061487 | 4/2014 |
| JP | 2014117653 | 6/2014 |
| WO | 2002062708 | 8/2002 |
| WO | 2004011600 | 2/2004 |
| WO | 2005017352 | 2/2005 |
| WO | 2005080750 | 9/2005 |
| WO | 2007033675 | 3/2007 |
| WO | 2010065791 | 6/2010 |
| WO | 2010091078 | 8/2010 |
| WO | 2010108872 | 9/2010 |
| WO | 2011132427 | 10/2011 |
| WO | 2012133661 | 4/2012 |
| WO | 2012140659 | 10/2012 |
| WO | 2013033082 | 3/2013 |
| WO | 2013043118 | 3/2013 |
| WO | 2013090901 | 6/2013 |
| WO | 2013164541 | 11/2013 |
| WO | 2014015307 | 1/2014 |
| WO | 2014126925 | 8/2014 |
| WO | 2015/058109 | 4/2015 |
| WO | 2015104957 | 7/2015 |
| WO | 2016037999 | 3/2016 |
| WO | 2017149101 | 9/2017 |

OTHER PUBLICATIONS

Notification of Transmittal of the International Preliminary Report on Patentability dated Jan. 23, 2020 for International Application No. PCT/EP2018/068804 enclosing the Written Opinion of the International Search Authority—The European Patent Office—dated Oct. 15, 2018 for PCT/EP2018/068804, 8 pages.

Search Report dated Nov. 28, 2017 from the United Kingdom Intellectual Property Office for Application No. GB1711240.0, 4 pages.

Cohen-Tanugi, et al., "Water Desalination Across Nanoporous Graphene", American Chemical Society, 2012, pp. 3602-3608.

Helfer, et al., "Osmotic Power with Pressure Retarded Osmosis: Theory, Performance and Trends—A Review", Journal of Membrane Science, 453, 2014, pp. 337-358.

Lin, et al., "Hybrid Pressure Retarded Osmosis—Membrane Distillation System for Power Generation from Low-Grade Heat: Thermodynamic Analysis and Energy Efficiency", American Chemical Society, 2014, pp. 5306-5313.

McGinnis, et al., "A novel amonia-carbon dioxide osmotic heat engine for power generation", Journal of Membrane Science, 305, 2007, pp. 13-19.

O'Hern, et al., "Selective Ionic Transport Through Tunable Subnanometer Pores in Single-Layer Graphene Membranes", American Chemical Society, 2014, pp. 1234-1241.

Response to Office Action dated Feb. 28, 2020 by the European Patent Office for EP 18739539.7, as-filed in the European Patent Office on Sep. 8, 2020, 13 pages.

* cited by examiner

POWER GENERATION PROCESS

RELATED APPLICATIONS

The present application claims benefit of and priority to PCT/EP2018/068804, filed Jul. 11, 2018, which claims priority to and benefit of Great Britain Patent Application No. 1711240.0, filed Jul. 12, 2017, each of which is hereby incorporated by reference for all purposes, as if set forth herein in its entirety.

FIELD OF INVENTION

The invention relates to a process for power generation. Specifically, it relates to the generation of power from warm saline streams obtained from geothermal sources.

BACKGROUND OF THE INVENTION

Much effort is currently being directed towards novel and renewable sources of energy which do not rely on fossil fuels. Possible renewable energy sources that have been identified include geothermal energy and latent osmotic energy and various schemes for the production of power from these sources have been suggested. However, there remains a need to increase the efficiency of such schemes in order to make them commercially viable. It would be advantageous therefore to identify more efficient ways of extracting power from geothermal and/or osmotic power sources.

WO2016/037999 discloses a process for the generation of electricity comprising extracting a warm saline stream from a geothermal formation, and (a) converting thermal energy present in said stream into electricity and (b) converting latent osmotic energy present in said stream into electricity by passage through an osmotic power unit. In addition to the increase in power generation which may be expected from extracting two different types of energy from the same source, WO 2016/037999 discusses how the two energy extraction processes may complement each other to reduce inefficiencies in each process caused by certain characteristics of warm saline streams from geothermal formations, including high salt content of such streams causing fouling of the thermal power unit and high temperatures of such streams reducing the operating efficiency and/or lifetime of commercially available osmotic membranes. It would be advantageous to identify methods of improve the economics of such a process The present invention seeks to mitigate the above-mentioned problems. Alternatively or additionally, the present invention seeks to provide an improved power generation process.

SUMMARY OF THE INVENTION

In one aspect the present invention provides a power generation process, the process comprising the steps of: extracting a warm saline stream from a geothermal formation; extracting thermal energy present in said stream by passage through a thermal power unit; and converting latent osmotic energy present in the saline stream into an increase in the total pressure of said stream by passage through an osmotic pump unit in which said stream is passed over one side of a semi-permeable membrane which permits the passage of water but not the passage of salts, an aqueous stream of lower salinity than said stream being passed over the other side of said membrane such that the need for mechanical pumping in subsequent process steps is reduced.

In one aspect the present invention provides a power generation process, the process comprising the steps of: extracting a warm saline stream from a geothermal formation; extracting thermal energy present in said stream by passage through a thermal power unit; and passing the saline stream through an osmotic pump unit in which said stream is passed over one side of a semi-permeable membrane which permits the passage of water but not the passage of salts, an aqueous stream of lower salinity than said stream being passed over the other side of said membrane to produce a higher-pressure output stream.

In one aspect the present invention provides a power generation process, the process comprising the steps of: extracting a warm saline stream from a geothermal formation; extracting thermal energy present in said stream by passage through a thermal power unit; and converting latent osmotic energy present in the saline stream into an increase in the total pressure of said stream instead of or as well as using latent osmotic energy present in said stream to produce electricity, by passing said stream through an osmotic pump unit in which said stream is passed over one side of a semi-permeable membrane which permits the passage of water but not the passage of salts, an aqueous stream of lower salinity than said stream being passed over the other side of said membrane.

In one aspect the present invention provides a power generation system comprising: a connection to a warm saline stream extracted from a geothermal formation; a thermal power unit arranged to extract thermal energy from the warm saline stream, and an osmotic pump unit arranged to increase the total pressure of a high-salinity input derived from said warm saline stream using the difference in salinity between said high-salinity stream and a low-salinity input stream thereby producing a high-pressure output stream.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
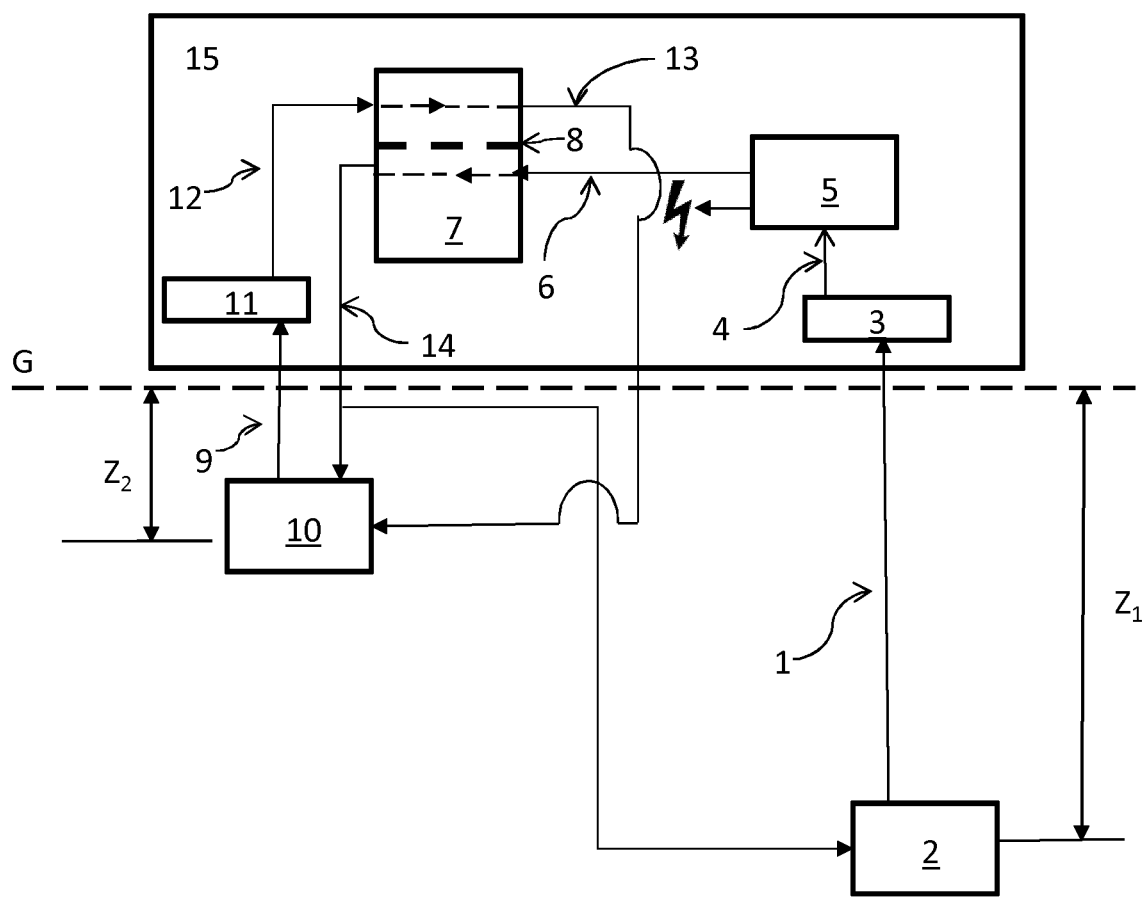
FIG. 1 shows a schematic view of a power generation process according to a first example embodiment of the invention.

In one aspect of the invention there is provided a power generation process, the process comprising the steps of: extracting a warm saline stream from a geothermal formation; and increasing the total pressure of said stream by passage through an osmotic pump unit in which said stream is passed over one side of a semi-permeable membrane which permits the passage of water but not the passage of salts, an aqueous stream of lower salinity than said stream being passed over the other side. In contrast to prior art methods which use the latent osmotic energy to produce electricity, the method of the present invention uses the latent osmotic energy to pump (e.g. increase the energy of) the stream to provide a higher-pressure output stream derived from the saline stream. Thus, instead of, or as well as, using latent osmotic energy present in the stream to generate electricity the process may comprise using latent osmotic energy present in the stream to increase the total pressure of the stream. Increasing the total pressure of the stream may reduce the need for mechanical pumping in subsequent process steps. The process may therefore comprise using the latent osmotic energy present in said saline stream to offset mechanical pump work at other stages of the process. This process may result in a system that produces a more efficient system (e.g. a larger net energy gain) than systems such as that described in WO2016/037999 which convert the latent osmotic energy into electricity because of the inefficiencies in that electricity generation process.

Total pressure ($p_0$) may be defined as:

$$p_0 = p + q + \rho g h$$

Where p is the static pressure, q is the dynamic pressure, $\rho$ is the density of the fluid, g is acceleration due to gravity, and h is the height above a datum. The dynamic pressure may be defined as:

$$q = \tfrac{1}{2} \rho v^2$$

Where v is the velocity of the fluid. Thus, the total pressure of the saline stream immediately upstream of the osmotic pump unit may be greater than the total pressure immediately downstream of the osmotic pump unit as a result of water flowing across the membrane from the aqueous feed stream to the saline stream.

It will be appreciated that increasing the total pressure of the saline stream may give rise to a corresponding increase in the volumetric flow rate (i.e. the volume of liquid passing per unit time) and/or mass flow rate (i.e. the mass of a substance passing per unit time) of the stream. Thus, the volumetric flow rate and/or mass flow rate of the saline stream immediately upstream of the osmotic pump unit may be less than the volumetric flow rate and/or mass flow rate of the saline stream immediately downstream of the osmotic pump unit.

The initial inputs to the osmotic pump unit comprise one higher-salinity stream and one lower-salinity stream. As the two streams pass over the membrane water from the lower-salinity stream will flow across the membrane into the higher-salinity stream, thereby increasing the total pressure of said stream. That is to say the latent osmotic energy present in the stream is transformed into an increase in total pressure by passage through the pump unit. The two outputs from the osmotic pump unit may comprise a higher-pressure stream derived from the (lower-pressure) higher-salinity stream and a stream derived from the lower-salinity stream. It will be appreciated that the term 'higher-pressure' refers to the total pressure of the stream output from the osmotic pump unit relative to the total pressure of the high-salinity stream input to the unit. After passage over the membrane, the first stream (initial higher salinity) will be reduced in salinity while the second stream (initial lower salinity) will be increased in salinity.

At least part, for example all, of the higher-pressure stream output by the osmotic pump unit may be injected into the ground through a re-injection well. The re-injection well may be made using conventional techniques. Thus, after the total pressure of the saline stream has been increased by passage through the osmotic pump unit the process may comprise injecting at least part of the stream into an underground formation. The increased total pressure of the stream as a result of the work done by the osmotic pump unit may reduce the amount of work required to inject the stream underground and thereby increase the overall efficiency of the process. Thus, the process may comprise increasing the total pressure of said stream by passage through an osmotic pump unit in which said stream is passed over one side of a semi-permeable membrane which permits the passage of water but not the passage of salts, an aqueous stream of lower salinity than said stream being passed over the other side of said membrane such that the need for mechanical pumping during injection of said stream into an underground formation is reduced.

The process may also comprise inserting the aqueous exit stream (derived from the low-salinity stream after passage through the osmotic pump unit) into an underground formation. Alternatively, the aqueous exit stream may be returned to a river or lake, for example the source from which the aqueous feed stream was obtained.

At least part of, for example all of, the higher-pressure stream output by the osmotic pump unit may be passed through a pressure exchanger. The pressure exchanger may be configured to transfer energy from the higher-pressure stream to a lower-pressure stream in order to increase the total pressure of said stream. Increasing the pressure of the low-pressure stream may increase the efficiency of a process in which that stream is used. For example, the increased pressure of the low-pressure stream may reduce the amount of pump work required in another process in order to achieve a given flow rate. Thus, the process may comprise increasing the total pressure of said stream by passage through an osmotic pump unit in which said stream is passed over one side of a semi-permeable membrane which permits the passage of water but not the passage of salts, an aqueous stream of lower salinity than said stream being passed over the other side of said membrane and then using the higher-pressure stream so produced to increase the total pressure of another stream to produce an increased-pressure stream. The increased-pressure stream may be used in a desalination plant. The process may comprise converting latent osmotic energy present in the saline stream into an increase in total pressure of said stream and then using energy represented by said total pressure to do work on a second, different, stream to increase the pressure of that stream.

At least part of, for example all of, the higher-pressure stream output by the osmotic pump unit may be mixed with another stream. After the total pressure of the saline stream has been increased by passage through the osmotic pump unit the process may comprise mixing said stream with another stream.

The process may comprise a step of extracting thermal energy present in said warm saline stream, for example by passage through a thermal power unit. The step of extracting thermal energy from said warm saline stream may comprise reducing the temperature of said warm saline stream by passage through a thermal power unit in which thermal energy present in said stream is converted into electricity or heat.

Any suitable means may be used to extract thermal energy from the warm saline stream. The stream may be passed through a thermal power unit comprising a heat exchanger. The stream may be passed through a thermal power unit comprising a steam generator. Extracting thermal energy from the warm saline stream may comprise converting the thermal energy into electricity or heat.

The process may comprise extracting thermal energy from the warm saline stream in the form of heat by passing the stream through a thermal power unit comprising a heat exchanger. The process may comprise using the heat so produced in a district heating system. For example, the thermal power unit may be configured to transfer heat from the warm saline stream to the circulating fluid of a district heating system. The use of a heat exchanger is preferred in many circumstances, especially where the initial temperature of the warm saline stream emerging from the geothermal formation is less than 150° C. The process may comprise converting thermal energy from the warm saline stream into electricity by passing the warm saline stream through a thermal power unit comprising a steam generator. Particularly where the stream is of very high temperature and high pressure, steam from the geothermal stream may be used directly to drive the steam generator.

Conventional means of handling warm streams which may be in either the liquid phase or the gaseous phase or both are well known, and any such means may be used in the present invention.

The process may comprise further increasing the total pressure of the higher-pressure stream by passage through a pump, for example a mechanical pump.

In some circumstances it may be beneficial to use the salinity gradient (or osmotic gradient) between the high-salinity stream and the low-salinity stream to both increase the total pressure of the high-salinity stream and to generate electricity. Thus, in addition to passing the stream through the osmotic pump unit, the process may comprise the step of: converting latent osmotic energy present in said stream into electricity by passage through an osmotic power unit in which said stream is passed over one side of a semi-permeable membrane which permits the passage of water but not the passage of salts, a low salinity stream derived from an aqueous feed stream being passed over the other said of said membrane. Alternatively, it may be that the process does not include converting latent osmotic energy present in said stream into electricity.

The geothermal formation may yield a warm saline stream having a temperature of at least 45° C., preferably at least 55° C., for example at least 70° C. The salt content may be anything up to saturation. Preferably the salt content is at least 10% wt, preferably at least 15% wt, especially at least 20% wt. It will be understood that saline streams from geothermal sources may contain a wide variety of dissolved salts, with a preponderance of sodium chloride, and that "salt content" refers to total salt content. The exact nature of the salt(s) present in such streams is not important. Similarly, the terms high(er)-salinity and low(er)-salinity are used herein to refer to streams having a corresponding "salt content"—the exact nature of the salt(s) present in such streams is not important. A salinity difference of 1% wt between the low-salinity and high-salinity side of an osmotic membrane may give an osmotic pressure difference of 10 bar. Thus, the total pressure difference between a point on the flow path of the higher-salinity stream immediately upstream of the osmotic pump unit and a point immediately downstream of the osmotic pump unit may be greater than 10 bar, for example greater than 20 bar, for example greater than 50 bar. It will be appreciated that this pressure difference will depend at least in part on the salinity of the input streams and the pressure resistance of the membrane.

For convenience the process of extracting thermal energy present in the warm saline stream extracted from a geothermal formation may be referred to hereafter as step (a). The process of converting latent osmotic energy present in said stream into an increase in total pressure may be referred to hereafter as step (b).

The process of the invention uses a warm saline stream obtained from a geothermal formation. The warm stream is extracted from the ground using conventional drilling techniques and is generally subject to any necessary pretreatment steps prior to step (a) and/or (b). For example, filtration to remove solid material is likely to be necessary, as might other conventional processes depending on the exact nature of the warm stream. Some geothermal streams have a very high salt content, and if step (a) is to be carried out prior to step (b), it may be necessary to reduce the salt content prior to carrying out step (a) to prevent precipitation of solid salt(s) as the temperature drops.

Step (a) of the process of the invention converts thermal energy into electricity or heat, while step (b) of the process of the invention uses the salinity gradient between said stream and an aqueous feed stream to increase the total pressure of the stream. Steps (a) and (b) may be carried out in either order along the flow path of the saline stream, or at the same point on the flow path. If step (a) is carried out first (e.g. upstream of step (b)), the output from step (a) is a cooled saline stream, which is passed to the osmotic pump unit of step (b). If step (b) is carried out first (e.g. upstream of step (a)), the output from step (b) is a warm stream of reduced salinity, which is passed to step (a). Preferably step (a) is carried out first.

In some embodiments, steps (a) and (b) are carried out at the same time: in such an embodiment, the osmotic pump unit forms part of the apparatus for utilizing the heat present in the warm stream, for example a heat exchanger, or such apparatus forms part of an osmotic pump unit. Heat is removed from the warm saline stream at the same time as the stream is passed over the surface of the semi-permeable membrane, and water flows into the high salinity stream thereby increasing the total pressure of that stream.

Steps (a) and (b), as well as the steps of extracting the saline stream may be carried out simultaneously. The steps of injecting the stream into an underground formation (if present) and passing the stream through a pressure exchanger (if present) may also be carried out simultaneously.

For step (a), a warm stream is passed through means, for example one or more heat exchangers and/or steam generators, to extract thermal energy. Any type of conventional power generation system may be used. If step (a) is carried out before step (b), the output from step (a) is a cooled saline stream, and this is used as the feed for step (b). If step (a) is carried out after step (b), the output from step (a) will be a cool high-pressure stream which may be injected into an underground formation.

Step (b) utilizes osmosis to draw water into the high-salinity stream thereby increasing the total pressure of that stream. An osmotic pump unit is a unit which converts latent osmotic energy into a total pressure increase of a high-salinity stream to provide a higher-pressure output stream downstream of the pump unit. Any suitable osmotic pump unit may be used in the process of the present invention. The key feature of such a unit is the presence of a semi-permeable membrane which permits the passage of water but not of dissolved salt(s). Such membranes are commercially available, and any suitable membrane may be used. In addition, novel types of membrane, for example membranes based on a lipid or amphiphilic polymer matrix containing aquaporins, which are proteins which permit the passage of water but no other substance, may be used. Such membranes are described in for example WO 2004/011600, WO 2010/091078, US 2011/0046074 and WO 2013/043118. Other novel types of membrane include graphene-based membranes, for example those described by Cohen-Tanugi et al, Nano Lett. 2012, 12(7), pp. 3602-3608 and O'Hern et al, Nano Lett. 2014, 14(3), pp. 1234-1241]. More than one membrane may be present, and combinations of different types of membranes may be used. Thus the osmotic pump unit may contain more than one osmosis unit each containing a semi-permeable membrane.

The osmotic pump unit may comprise a housing. The osmotic pump unit may comprise an inlet via which the high-salinity stream enters the osmotic pump unit. The osmotic pump unit may comprise an outlet via which the high-pressure stream exits the osmotic pump unit. The total pressure of the high-salinity stream immediately upstream of the inlet may be less than the total pressure of the high-pressure stream immediately downstream of the outlet. The osmotic pump unit may further comprise a pressure exchanger configured to direct the pressure generated by the osmotic pump unit on the saline stream. The osmotic pump unit may be configured to convert the majority of the latent osmotic energy extracted from the high-salinity stream into an increase in the pressure of said stream downstream of the pump.

As well as the saline feed stream originating from the geothermal formation, step (b) requires a feed stream which is an aqueous stream having lower salinity than the saline stream originating from the geothermal formation. This lower-salinity stream may be obtained from any source, but is typically sea water, fresh or brackish water obtained, for example, from a river, a lake or an aquifer, or waste water obtained from an industrial or municipal source or condensate water from a power plant. The economics of a process according to the invention are likely to be particularly favorable when a geothermal well is located adjacent a sea, river or lake, with sourcing of the necessary streams and disposal of the waste streams both being easy and cheap. Throughout this specification, unless the context requires otherwise, "lower salinity" should be understood to include zero salinity.

The initial inputs to step (b) are thus one higher-salinity stream (the saline stream), and one lower-salinity stream. After passage over a membrane, the first stream (initial higher salinity) will be reduced in salinity and have an increased total pressure, while the second stream (initial lower salinity) will be increased in salinity and have a reduced total pressure as a result of the water moving across the membrane. The output streams from a first pass over the membrane will both have lower salinity than the original warm saline stream, and higher salinity than the original lower-salinity stream—at equilibrium, the two streams would have equal salinity, but this will rarely be achieved in practice. Therefore, either output stream can be reused as either the first stream or the second stream for a second pass over the original membrane, or as either the first stream or the second stream over a second membrane. These reused streams may be used alone, or merged with other input streams. Multiple cycles can be used to increase the overall efficiency of the process. As long as an outgoing stream from an osmosis unit has higher salinity than the initial input stream of lower salinity, it is possible to operate an additional osmosis unit and generate a further increase in pressure on the higher salinity stream. The optimal number of cycles will depend on the initial content of the streams, the efficiency of the membranes, and the flow rates selected.

The input to step (a) is a warm saline stream (which optionally has been subjected to one or more pre-treatment steps). The output from step (a) may be referred to as a cool saline stream. It will be appreciated that the term "cool" refers to the temperature of the saline stream with respect to the "warm" saline stream.

The inputs to step (b) are a high-salinity stream and a low-salinity stream. The outputs from step (b) are (i) a reduced-salinity exit stream derived from the high-salinity stream following passage over one or more membranes (this may be referred to as a high-pressure stream) and (ii) an aqueous exit stream derived from the low-salinity stream following passage over one or more membranes.

If step (b) is carried out after step (a), the ultimate output from step (b) will be a pressurized stream from the first side of the membrane and a waste stream from the second side of the membrane. If step (b) is carried out before step (a), the ultimate output from step (b) will be one stream derived from the original warm saline stream which now has reduced salinity and increased total pressure but which still retains heat and is at a temperature above ambient temperature. This stream is then used as the feed for step (a).

It will be appreciated that following extraction from the underground formation the warm saline stream (and streams derived therefrom) may flow through features that give rise to a pressure loss. The amount by which the total pressure is increased by passage through the osmotic pump unit may be less than the flow or pressure loss caused by the fluid flowing through the thermal power unit, or other elements of the system. Thus, while the total pressure increases across the osmotic pump unit, the reduced salinity exit stream may still be at a lower pressure or flow rate than the warm saline stream when it is initially extracted from the geothermal formation.

The efficiency of the process of the invention will depend upon the initial temperature and pressure of the warm saline stream, and also upon the quantity and nature of the salt(s) the stream contains. Another key feature determining the efficiency of the process will be the performance of the semi-permeable membrane, and optimization depends on a combination of two factors: the flux of water obtainable through the membrane, and the efficiency with which the membrane can reject salts. The use of multiple osmosis units as described above can also affect overall process efficiency.

In another aspect, the present invention may provide a power generation process, the process comprising the steps of: extracting a warm saline stream from a geothermal formation; extracting thermal energy present in said stream by passage through a thermal power unit; and increasing the total pressure of said stream by passage through an osmotic pump unit in which said stream is passed over one side of a semi-permeable membrane which permits the passage of water but not the passage of salts, an aqueous stream of lower salinity than said stream being passed over the other side of said membrane. It may be that the majority, for example all, of the latent osmotic energy extracted from the high-salinity stream by passage through the osmotic power unit is used to provide an increased total pressure in the reduced-salinity exit stream downstream of the osmotic pump unit. It may be that the process does not comprise converting latent osmotic energy present in the high-salinity stream into electricity.

In another aspect the present invention may provide a power generation system comprising: a connection to a warm saline stream extracted from a geothermal formation. The power generation system may comprise a thermal power unit arranged to extract thermal energy from the warm saline stream. The power generation system may comprise an osmotic pump unit arranged to increase the total pressure of a high-salinity input derived from said warm saline stream using the difference in salinity between said high-salinity stream and a low-salinity input stream to produce a high-pressure output stream. The system may be configured such that the osmotic pump increases the pressure of a stream provided to one or more of a thermal power unit, a re-injection well, a pressure exchanger or which is mixed with another stream.

The thermal power unit may extract thermal energy from the warm saline stream to produce a cooled output stream. The system may be arranged such that the cooled output stream of the thermal power unit is passed to the osmotic pump unit for use as the high-salinity input stream. Alternatively, the system may be arranged such that the high-pressure output stream derived from the warm saline stream after passage through the osmotic pump unit is passed the thermal power unit for heat extraction.

The thermal power unit may be arranged to generate electricity. The system may further comprise a connection to a district heating system. A district heating system may be configured to distribute heat generated in a centralized location to several different buildings or areas. The power generation system may be arranged such that the thermal power unit provides thermal energy extracted from the warm input stream to said district heating system. Thus the thermal power unit may be configured to heat the fluid circulating in the district heating system.

The system may further comprise a connection to a reinjection well. The reinjection well may be arranged to inject a stream into an underground formation. The system may be arranged such that at least part of the high-pressure output stream is passed to the reinjection well for injection into the underground formation. Thus, the osmotic pump unit may be arranged to increase the total pressure of a high-salinity stream prior to injection into an underground formation using the difference in salinity between said high-salinity stream and a low-salinity input stream.

The system may further comprise a pressure exchanger. The initial inputs to the pressure exchanger may be a higher-pressure stream and a lower-pressure stream. The pressure exchanger may be configured to transfer pressure from a higher-pressure stream to a lower-pressure stream. Following passage through the pressure exchanger the total pressure of the higher-pressure stream may be decreased and the total pressure of the lower pressure stream may be increased. The higher-pressure stream from the osmotic pump unit (or at least part of that stream) may be passed to the pressure exchanger for use as the higher-pressure stream. Thus, the osmotic pump unit may be arranged to increase the total pressure of a high-salinity stream prior passage through a pressure exchanger in which energy is transferred from the high-salinity stream to another stream in order to increase the total pressure of said stream.

The system may further comprise an osmotic power unit arranged to convert latent osmotic energy present in a high-salinity stream into electricity, for example through Pressure Retarded Osmosis (PRO). The osmotic power unit may be located along the flowpath of the saline stream upstream or downstream of the osmotic pump unit.

The osmotic pump unit, the thermal power unit (if present) and/or the osmotic power unit (if present) may be located above ground. The power generation system may comprise one or more conventional, mechanical, pumps in addition to the osmotic pump unit to further incrase the total pressure of the high-pressure stream. The system may comprise a mechanical pump arranged to increase the total pressure of a steam derived from the warm saline stream after passage through the osmotic pump unit and prior to insertion in the underground formation.

The power generation system may be mounted on a mobile platform, for example a road vehicle for example a tuck, heavy goods vehicle (HGV) or similar vehicle.

One example embodiment of the invention is illustrated schematically in FIG. 1. In FIG. 1, a warm saline stream 1 from a geothermal formation 2 at a depth $Z_1$ of around 1200 m is passed through one or more pre-treatment steps 3 and the resulting stream 4 is passed to a thermal power unit 5. In the thermal power unit 5 thermal energy is extracted and ultimately converted to electricity by conventional means not shown, and the warm stream 4 is cooled and exits as cooled saline stream 6. Stream 6 is passed to osmotic pump unit 7 where it is caused to flow at one side of a semi-permeable membrane 8 (denoted by a dashed line in FIG. 1) which permits passage of water but not of salts. An aqueous stream 9 which is of lower salinity that streams 1,4 and 6 is extracted from an aquifer 10 at a depth $Z_2$ of around 200 m, is passed through one or more pre-treatment steps 11 and the resulting stream 12 is passed to osmotic pump unit 7 where it is caused to flow at the other side of the semi-permeable membrane 8. Within osmotic pump unit 7, water flows from (low-salinity) stream 12 into (high-salinity) stream 6 via the semi-permeable membrane 8 thereby increasing the total pressure of stream 6. This flow of water will also increase the salinity of initially lower-salinity stream 12 and reduce the salinity of the high-salinity stream 6. Output from the osmotic pump unit 7 forms an aqueous exit stream 13 derived from the initial aqueous stream 12 (i.e. stream 12 minus the water that has flowed via the semi-permeable membrane 8) and a reduced salinity exit stream 14 derived from the cooled saline stream 6 (i.e. stream 6 plus the water that has flowed via the semi-permeable membrane 8). The stream 14 has a higher total pressure than cooled saline stream 6 and may therefore be referred to as a higher-pressure stream 14. Some or all of reduced salinity exit stream 14 is injected into the geothermal reservoir 2 from which the warm saline stream 1 was extracted, and the remainder (if any) of exit stream 14 can be injected into the aquifer 10 from which the aqueous stream 9 was extracted. Some or all of aqueous exit stream 13 is injected into the aquifer 10 from which the aqueous stream 9 was extracted. Pre-treatment steps 3, heat exchanger 5, pre-treatment steps 11 and osmotic pump unit 7 are located within a power station 15 above ground level, which is denoted by a dashed line labelled G in FIG. 1). Typical properties for the various streams are summarised in Table 1 below.

TABLE 1

Typical Stream Properties

| Stream | Flow rate (m³/hour) | Temperature (° C.) | % total salt content. |
|---|---|---|---|
| Warm Saline Stream 1 | 100 | 70 | 15-20 |
| Cool Saline Stream 6 | 100 | 15 | 15-20 |
| Aqueous feed stream 9 | 100 | 15-20 | 0-1 |
| Aqueous exit stream 13 | 25 | 15 | 0-4 |
| Reduced salinity exit stream 14 | 175 | 15 | 8-11 |

Systems in accordance with the present embodiment may be more efficient than prior art systems because the increased total pressure of reduced salinity exit stream 14 following passage through the osmotic pump unit reduces the amount of pump work required in order to inject the reduced salinity exit stream 14 into the reservoir 2. Thus, the latent osmotic energy present in the geothermal stream is used to reduce the amount of energy required to inject the stream back into the ground. Using the latent osmotic energy in this way (rather than to generate electricity) may lead increase the efficiency of the process overall.

Figure 2:
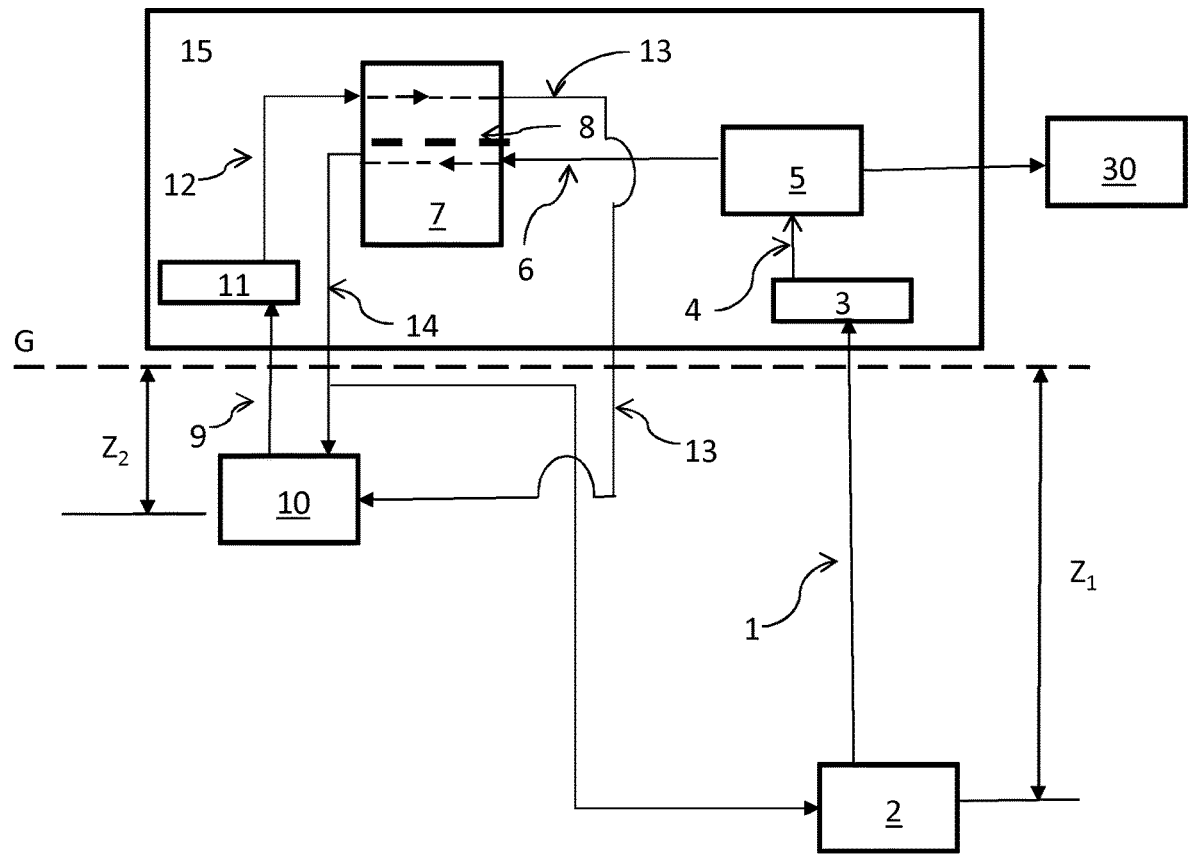
FIG. 2 shows a schematic view of a power generation process according to a second example embodiment of the invention.

FIG. 2 shows a second example power generation system in accordance with the present invention. Only those elements of the present embodiment which differ with respect to the first embodiment will be discussed here. Like reference numerals denote like elements. In the system of the second embodiment the thermal power unit 5 extracts thermal energy from warm saline stream 4 and provides that energy as heat to a district heating system 30. Again, the warm stream 4 is cooled and exits as cooled saline stream 6. In certain operating conditions, for example when the temperature of the warm saline stream is below 70° C. using the thermal power unit 5 to extract heat, rather than to generate electricity, may be more efficient. Thus, systems in accordance with the present embodiment may be more efficient than prior art systems because the thermal energy is used to generate heat and increase total pressure rather than generate electricity.

Figure 3:
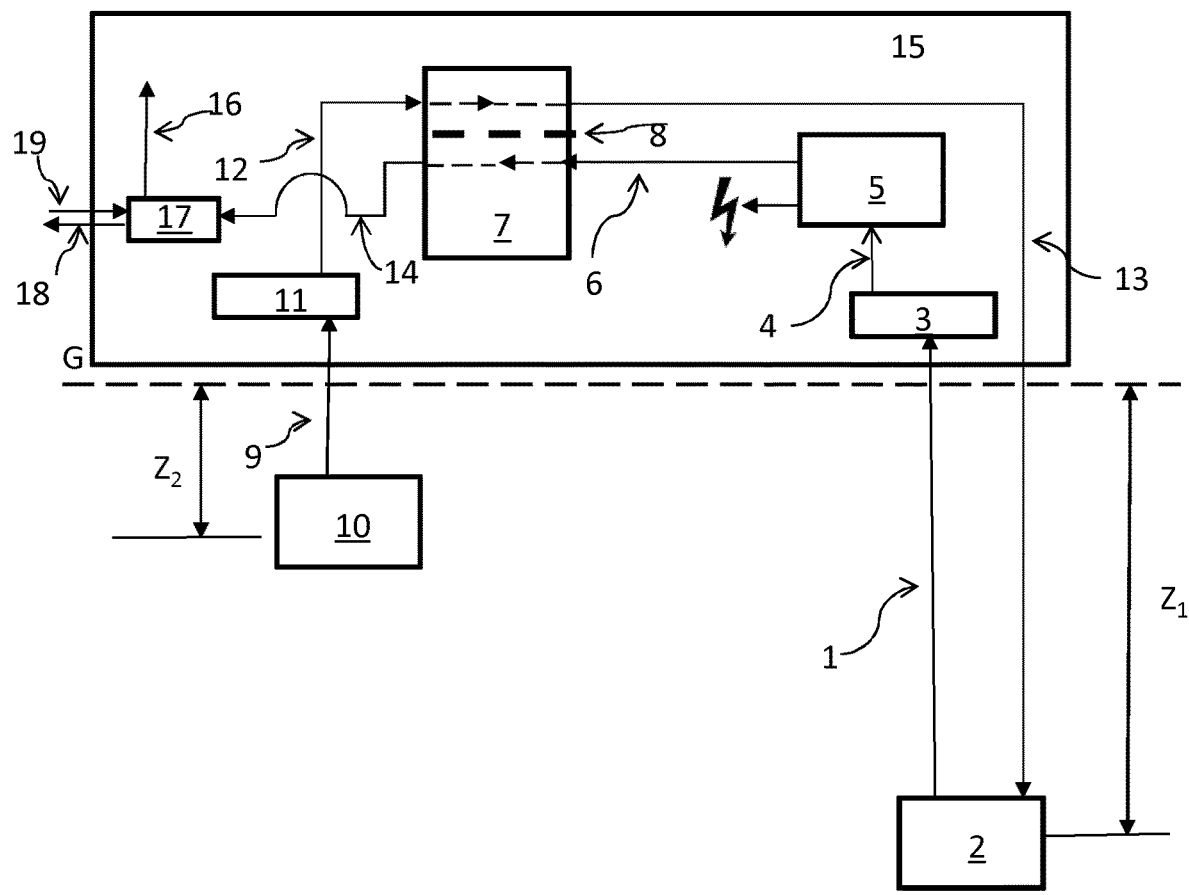
FIG. 3 shows a schematic view of a power generation process according to a third example embodiment of the invention.

FIG. 3 shows a third example power generation system in accordance with the present invention. Only those elements of the present embodiment which differ with respect to the first embodiment will be discussed here. Like reference numerals denote like elements. In the system of the third embodiment a pressure exchanger 17 is located downstream of the osmotic pump 7 on the flow path of the reduced salinity exit stream 14 (the higher-pressure stream). The other input to the pressure exchanger 17 is a low pressure stream 19. Within pressure exchanger 17 a portion of the hydraulic energy of stream 14 is used to increase the pressure of lower pressure stream 19. The outputs of the pressure exchanger 17 are therefore a reduced pressure stream 18 derived from reduced salinity exit stream 14 and an increased pressure stream 16 derived from lower pressure stream 19. The reduced pressure stream 18 may be disposed of in a nearby river. The increased pressure stream 16 may be used elsewhere in the power generation system or another process. Some or all of aqueous exit stream 13 is injected into the geothermal reservoir 2 from which the saline stream 1 was extracted. Using the latent osmotic energy present in the geothermal stream to increase the pressure of low pressure stream 19 may reduce the amount of pump work required in the process in which stream 16 is used. Using the latent osmotic energy in this way (and the corresponding reduction in pump energy) may lead increase the efficiency of the process overall. In another embodiment (not shown) the low pressure stream input to the pressure exchanger 17 may be the low-salinity stream 12 prior to use in the osmotic pump unit 7.

Figure 4:
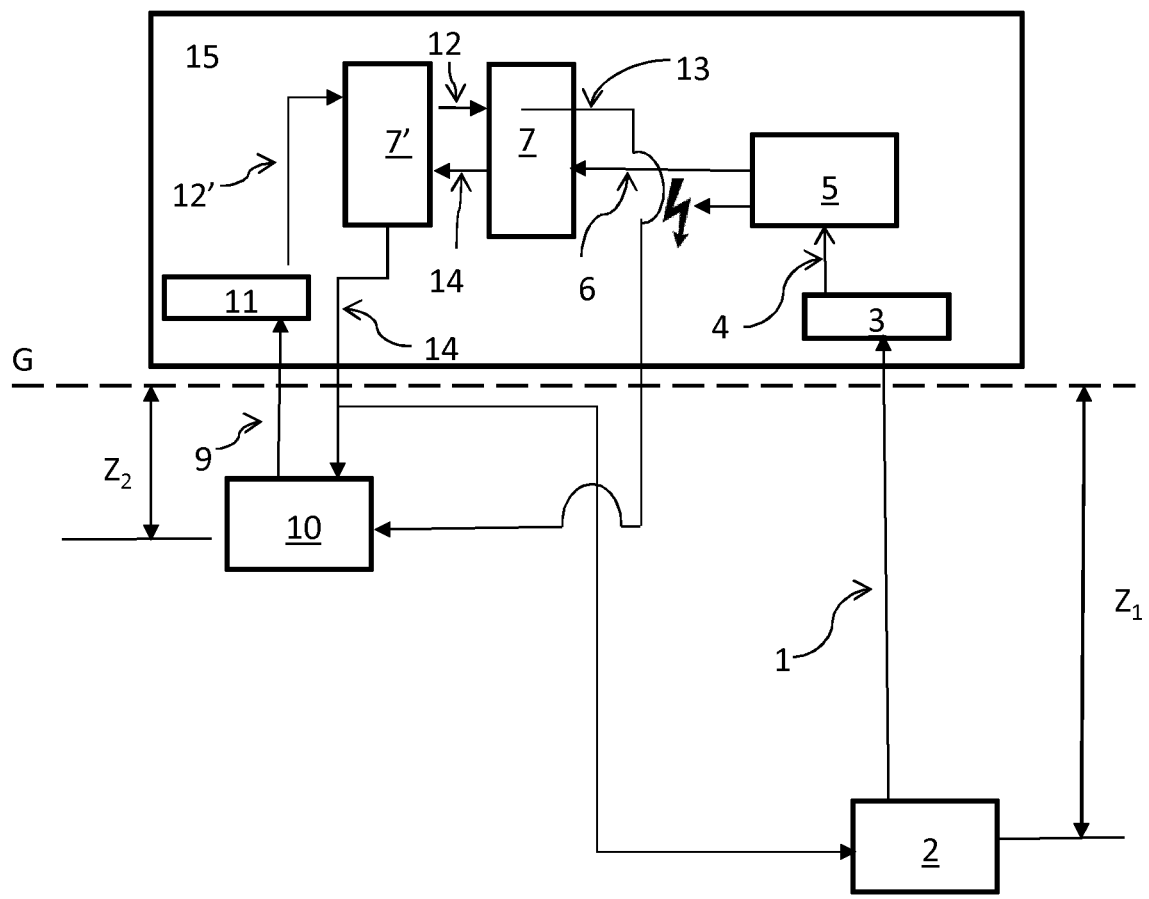
FIG. 4 shows a schematic view of a power generation process according to a fourth example embodiment of the invention.

FIG. 4 shows a fourth example power generation system in accordance with the present invention. Only those elements of the present embodiment which differ with respect to the first embodiment will be discussed here. Like reference numerals denote like elements. In the fourth embodiment, an osmotic power unit 7' is located downstream of the osmotic power unit 7 on the flow path of the reduced salinity exit stream 14, and upstream of the osmotic power unit 7 on the flow path of the low salinity stream 12. The inputs to the osmotic power unit 7' are reduced salinity exit stream 14 and initial low salinity input stream 12'. The outputs from the osmotic power unit are low salinity stream 12 and reduced salinity exit stream 14'. The salinity of stream 12 will be higher than the initial low salinity stream 12' but is still less than reduced salinity exit stream 14' and 14. The salinity of stream 14' will be less than exit stream 14 but higher than low salinity stream 12'. Within osmotic power unit 7' water flows from stream 12' into stream 14 via the semi-permeable membrane causing an increased in pressure due to the confined space, and this excess pressure is ultimately converted to electricity by conventional means not shown. Exit stream 14' can be disposed of as required, for example by insertion into the geothermal reservoir 2 or aquifer 10.

Figure 5:
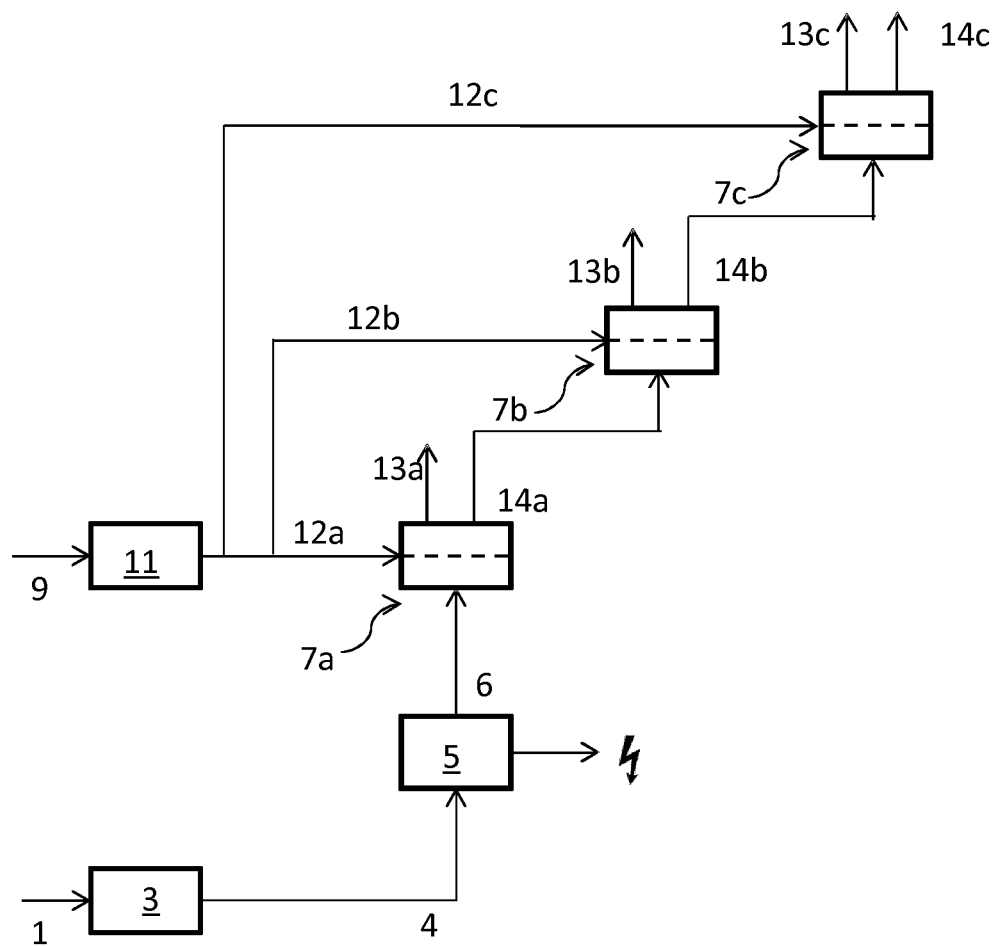
FIG. 5 shows variant of the process of FIG. 1 in which multiple osmosis units are used.

FIG. 5 shows a variant of the process of FIG. 1 in which multiple osmosis units 7a, 7b and 7c are connected in series in a power generation system according to the invention. Like reference numerals denote like elements. Each osmosis unit 7a, 7b and 7c contains a semi-permeable membrane (not shown) which permits passage of water but not of salts. Original high salinity stream 6 flows at one side of the semipermeable membrane, while lower-salinity stream 12a flows at the other side. Output stream 14a from osmosis unit 6a, which has a salt content lower than that of original geothermal input streams 4 and 6, is fed to a second osmosis unit 7b where it is passed over one side of a semi-permeable membrane. A second input stream 12b of relatively low salinity water is obtained from original aqueous stream 9 after passage through one or more pretreatment steps 11. Although the difference in salinity between streams 14a and 12b is lower than the difference in salinity between streams 6 and 12a, there is still a difference in salinity, and an increase in the total pressure of stream 14a can be generated by osmosis. Output stream 14b from osmosis unit 7b, which has a salt content lower than that of original geothermal input streams 4 and 6, and also lower than stream 14a, is fed to a third osmosis unit 7c where it is passed over the other side of a semi-permeable membrane from a further input stream 12c of relatively low salinity water.

Although the difference in salinity between streams 14b and 12c is lower than the difference in salinity between streams 6 and 12a, or between streams 14a and 12b, there is still a difference in salinity, and an increase in the total pressure of stream 14b can be generated by osmosis. Output streams from the process of FIG. 5 are aqueous exit streams 13a, 13b, and 13c, and these streams may be disposed of by injecting these streams into the aquifer 10. The higher-pressure exit stream 14c may be injected into geothermal formation 2 from which the high salinity stream 1 is extracted.

Figure 6:
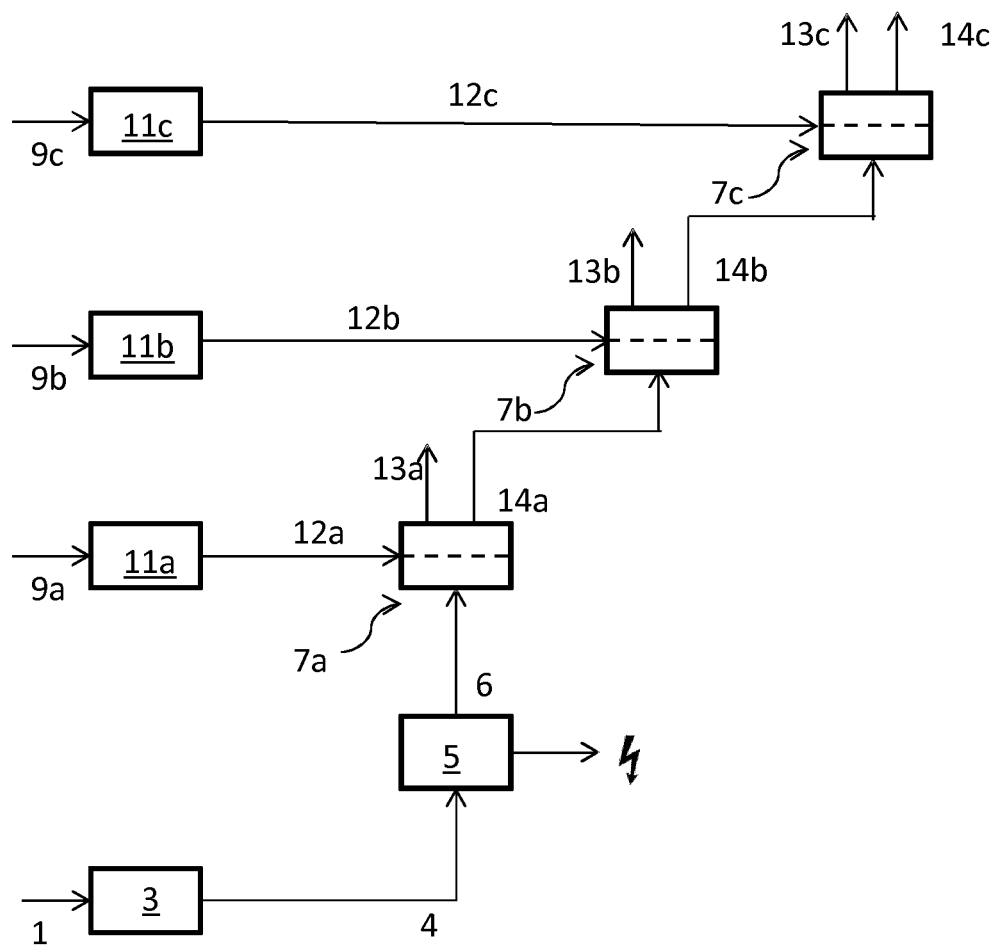
FIG. 6 shows a variant of FIG. 5 with alternative input streams.

FIG. 6 shows a variant of FIG. 5 in which input streams 12a, 12b and 12c of relatively low salinity water are provided as separate input streams 9a, 9b and 9c, each undergoing one or more pre-treatments steps 11a, 11b and 11c.

Figure 7:
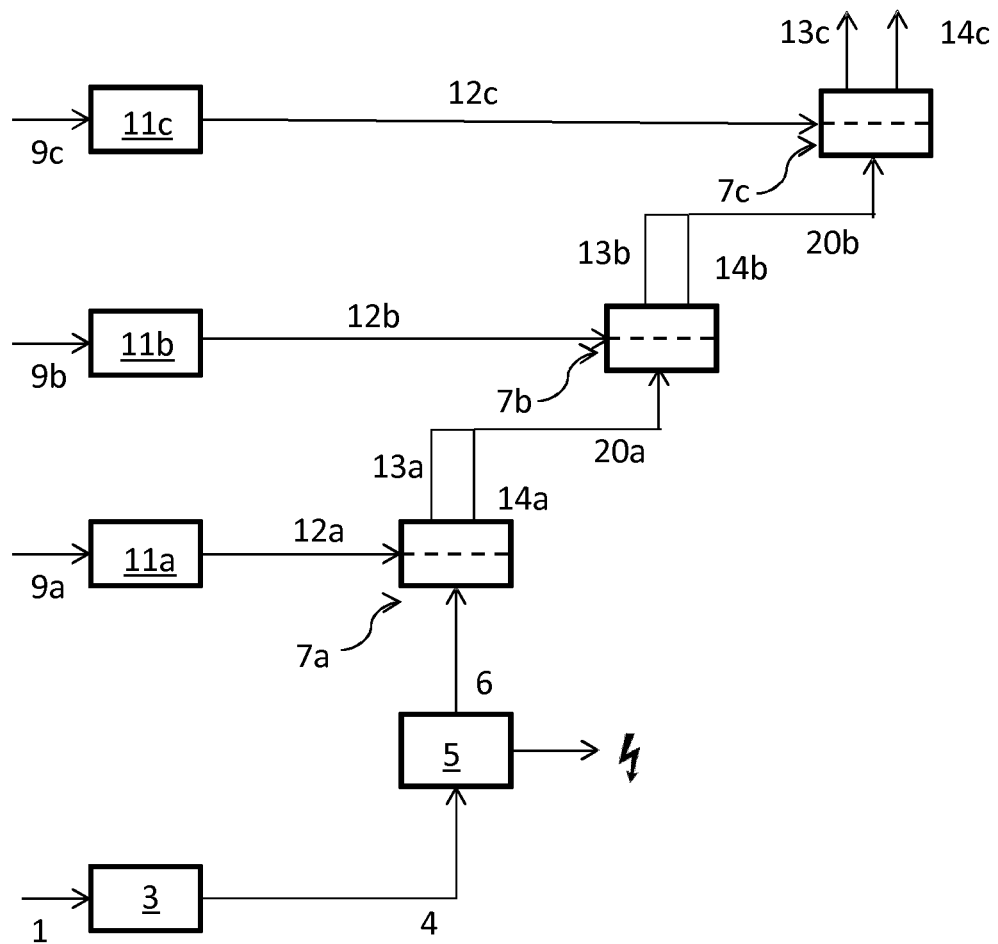
FIG. 7 shows a variant of FIG. 6 with alternative output streams.

FIG. 7 shows a variant of FIG. 6 in which output streams are handled in a different way. Outlet streams 13a and 14a from osmosis unit 7a are merged, and at least part of the merged stream is provided as input stream 20a to osmosis unit 7b. The merged stream 20a will have a salt content lower than that of original geothermal input streams 4 and 6, and although the difference in salinity between stream 20a and stream 12b is lower than the difference in salinity between streams 6 and 12a, there is still a difference in salinity, and an increase in the total pressure of stream 20a can be generated by osmosis. Similarly, outlet streams 13b and 14b from osmosis unit 7b are merged, and at least part of the merged stream is provided as input stream 20b to osmosis unit 7c.

It will be understood that FIGS. 5, 6 and 7 show an osmosis pump unit consisting of 3 osmosis units each containing a semi-permeable membrane, but that any suitable number of units can be used, the choice being determined by a combination of technical and economic factors. In general, the higher the initial salinity of the warm saline stream 1, the higher the number of osmosis units which may be used.

Figure 8:
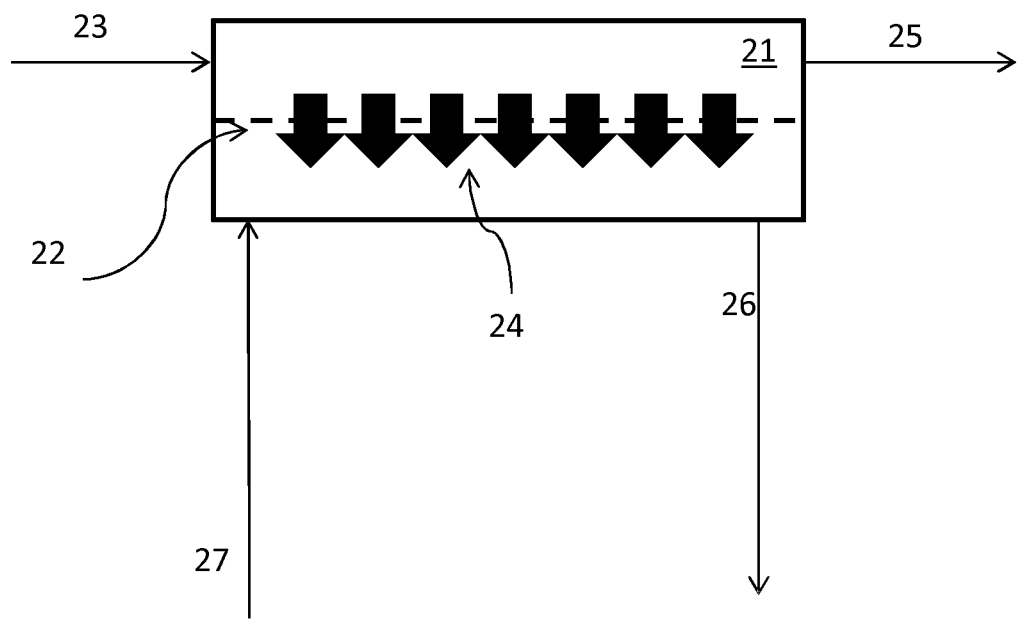
FIG. 8 shows an osmotic pump unit for use with the process of the present invention.

FIG. 8 shows more details of an osmotic pump unit 7. A saline stream 27 extracted from a geothermal formation (which may for example be stream 1, 4 or 6 of FIG. 1) is passed to an osmosis unit 21 containing a semi-permeable membrane 22 which permits passage of water but not of salts, and flows at one side of membrane 22. An aqueous stream 23 which is of lower salinity than stream 27 enters osmosis unit 21 and flows at the other side of membrane 22. Arrows 24 show the direction of water transport by osmosis across membrane 22. An output stream 25 derived from original input stream 23 and now containing a higher concentration of salt, leaves osmosis unit 21. An output stream 26 consisting of original input stream 20 now containing a lower concentration of salt but having a higher total pressure, leaves osmosis unit 21.

Whilst the present invention has been described and illustrated with reference to particular embodiments, it will be appreciated by those of ordinary skill in the art that the invention lends itself to many different variations not specifically illustrated herein. By way of example only, certain possible variations will now be described. It will be appreciated that the pre-treatment steps described above are not essential, and the nature and number of pre-treatment steps required in any particular application will depend, at least in part, on the nature on the properties of the fluid extracted from the formation in question. It will further be appreciated that the high-pressure output stream may be returned to a sea, river or lake, rather than injected underground.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A power generation process, the process comprising the steps of:
   extracting a saline stream from a geothermal formation;
   converting latent osmotic energy present in the saline stream into an increase in the total pressure of said saline stream by passage through an osmotic pump unit in which said saline stream is passed over one side of a semi-permeable membrane which permits the passage of water but not the passage of salts, an aqueous stream of lower salinity than said saline stream being passed over the other side of said membrane, wherein an output from the osmotic pump unit is a higher-pressure stream derived from the saline stream; and
   increasing a total pressure of a low-pressure stream by passing the low-pressure stream through a first side of a pressure exchanger and passing the higher-pressure stream through a second side of the pressure exchanger such that energy represented by the increase in the total pressure of said saline stream does work on the low-pressure stream to increase the total pressure of that low-pressure stream above a predetermined level.

2. A process according to claim 1, further comprising injecting at least part of said higher pressure stream into an underground formation.

3. A process according to claim 2, wherein the underground formation is the geothermal formation.

4. A process according to claim 1, the process further comprising mixing said the higher-pressure stream with another stream.

5. A process according to claim 1, further comprising extracting thermal energy present in said saline stream by passage through a thermal power unit.

6. A process according to claim 5, wherein the step of extracting thermal energy from said saline stream comprises reducing the temperature of said saline stream by passage through a thermal power unit in which thermal energy present in said saline stream is converted into electricity.

7. A process according to claim 5, wherein the step of extracting thermal energy from said saline stream comprises reducing the temperature of said saline stream by passage through a thermal power unit in which thermal energy present in said saline stream is used to provide heat to a district heating system.

8. A process according to claim 1, in which the osmotic pump unit contains more than one osmosis unit each comprising a semipermeable membrane which permits the passage of water but not the passage of salts.

9. A process as claimed in claim 8, in which an output stream from one osmosis unit is used as an input stream for a second osmosis unit.

10. A process according to claim 1, in which the saline stream has a temperature of at least 45° C.

11. A process according to claim 1, in which the saline stream has a salt content of at least 10% wt.

12. A process according to claim 1, in which the aqueous stream of lower salinity is sea water, fresh water or brackish water obtained from a river, lake or aquifer, or waste water obtained from an industrial or municipal source, or condensate water from a power plant.

13. A power generation system comprising:
   a connection to a warm saline stream extracted from a geothermal formation;
   an osmotic pump unit arranged to increase a total pressure of a high-salinity input derived from said warm saline stream using a difference in salinity between said high-salinity input and a low-salinity input stream thereby producing a high-pressure output stream, the power generation system is arranged such that said increase in the total pressure reduces the need for mechanical pumping in subsequent process steps; and a pressure exchanger configured to transfer energy represented by the increase in the total pressure to a second, different, stream to increase a pressure of the second stream above a predetermined level.

14. A power generation system according to claim 13, the system further comprising a connection to a reinjection well arranged to inject a stream into an underground formation, the system being arranged such that at least part of the high-pressure output stream is passed to the reinjection well for injection into the underground formation.

15. A power generation system according to claim 13 further comprising a thermal power unit arranged to extract thermal energy from the warm saline stream.

16. A power generation system according to claim 15, wherein the thermal power unit extracts thermal energy from the warm saline stream thereby producing a cooled output stream, the system being arranged such that the cooled output stream of the thermal power unit is passed to the osmotic pump unit for use as the high-salinity input stream.

17. A power generation system according to claim 15, wherein the thermal power unit is arranged to generate electricity.

18. A power generation system according to claim 15, wherein the system further comprises a connection to a district heating system, the system being arranged such that the thermal power unit provides heat extracted from the warm saline stream to said district heating system.

19. A power generation process, the process comprising the steps of:

extracting a saline stream from a geothermal formation;

converting latent osmotic energy present in the saline stream into an increase in the total pressure of said saline stream by passage through an osmotic pump unit in which said saline stream is passed over one side of a semi-permeable membrane which permits the passage of water but not the passage of salts, an aqueous streamof lower salinity than said saline stream being passed over the other side of said membrane, wherein an output from the osmotic pump unit is a higher-pressure stream derived from the saline stream; and increasing a total pressure of a low-pressure stream by passing the low-pressure stream through a first side of a pressure exchanger and passing the higher-pressure stream through a second side of the pressure exchanger such that energy represented by the increase in the total pressure of said saline stream does work on the low-pressure stream to increase the total pressure of that low-pressure stream above a predetermined level; and in which the saline stream has a temperature of at least 45° C. and the saline stream has a salt content of at least 10%wt.

* * * * *

UNITED STATES PATENT AND TRADEMARK OFFICE
CERTIFICATE OF CORRECTION

| | |
|---|---|
| PATENT NO. | : 11,231,021 B2 |
| APPLICATION NO. | : 16/630121 |
| DATED | : January 25, 2022 |
| INVENTOR(S) | : Henrik Tækker Madsen et al. |

It is certified that error appears in the above-identified patent and that said Letters Patent is hereby corrected as shown below:

In the Claims
1. In Column 15, Line 23, in Claim 16, delete "high-salinity input stream." and insert -- high-salinity input. --, therefor.
2. In Column 16, Line 13, in Claim 19, delete "streamof" and insert -- stream of --, therefor.

Signed and Sealed this
Twenty-second Day of November, 2022

Katherine Kelly Vidal
*Director of the United States Patent and Trademark Office*